INVENTOR.
James B. Lindsay

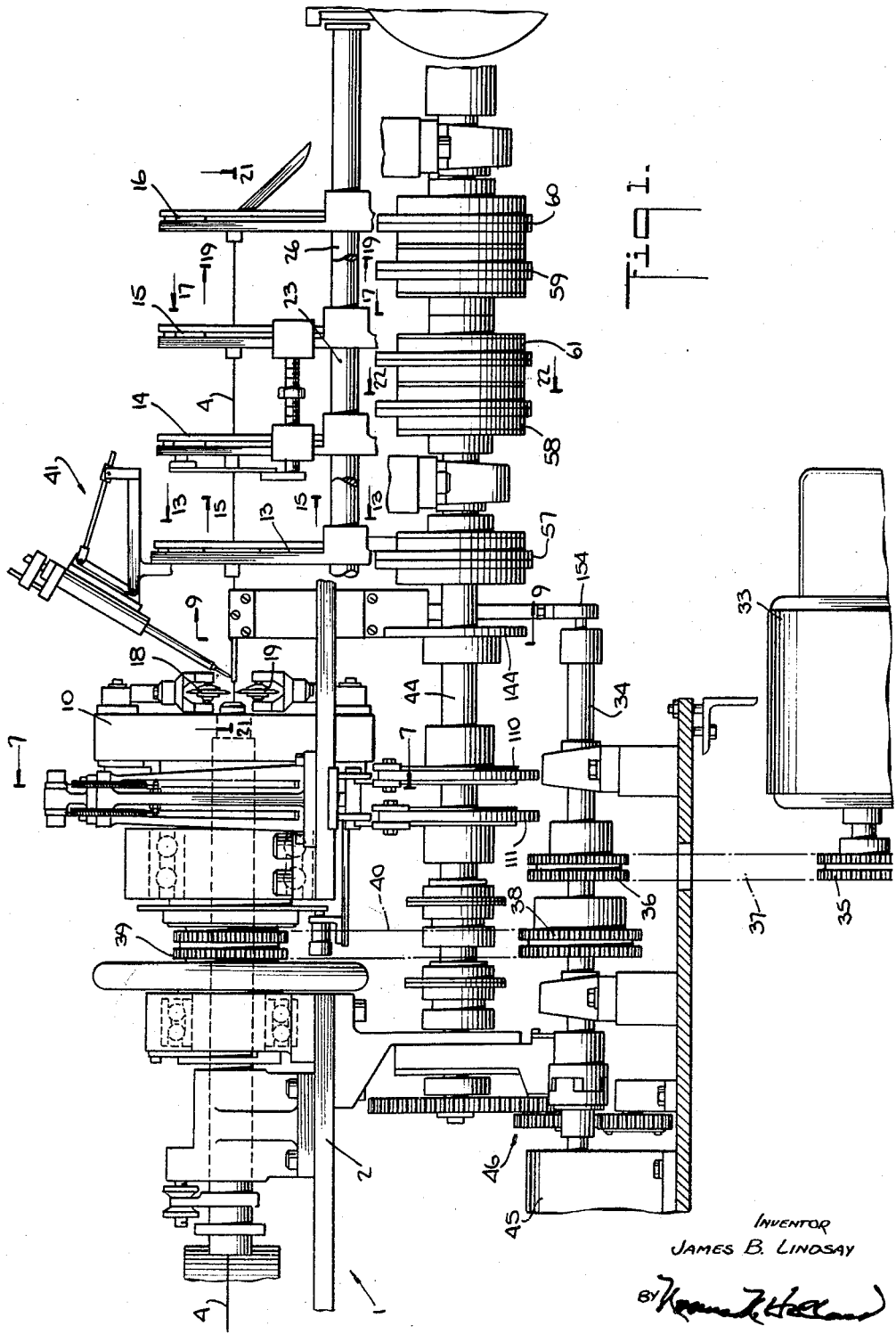

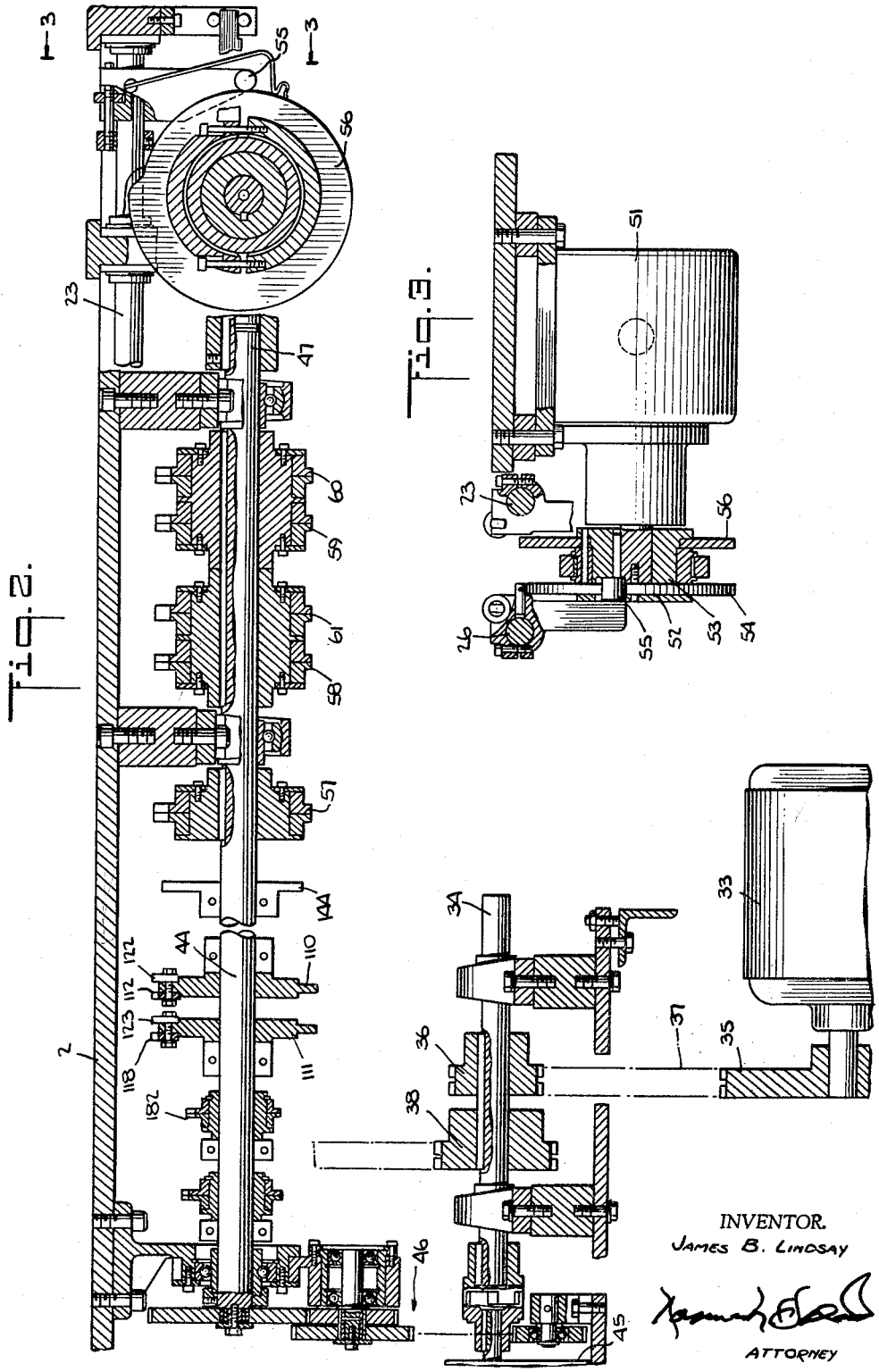

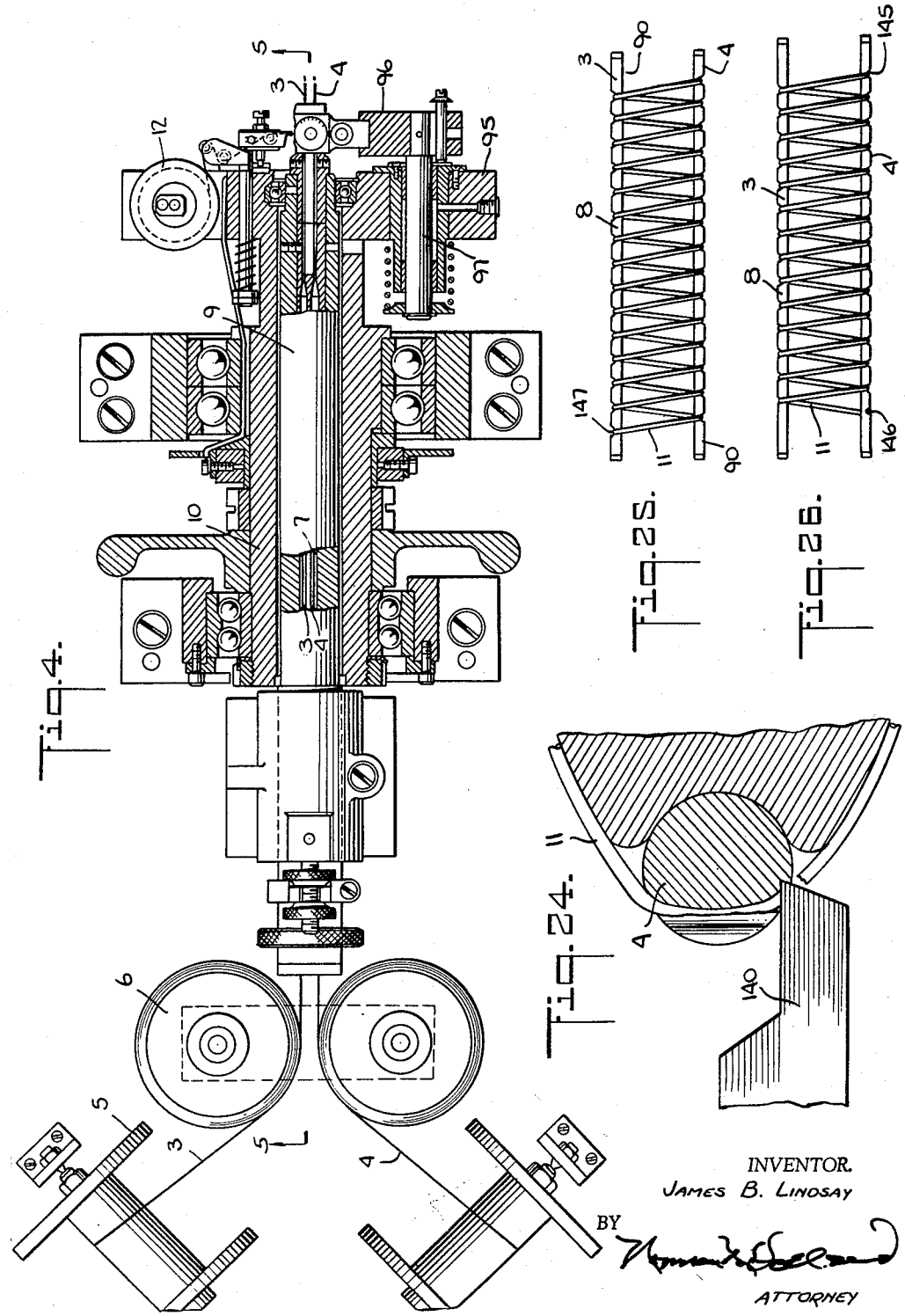

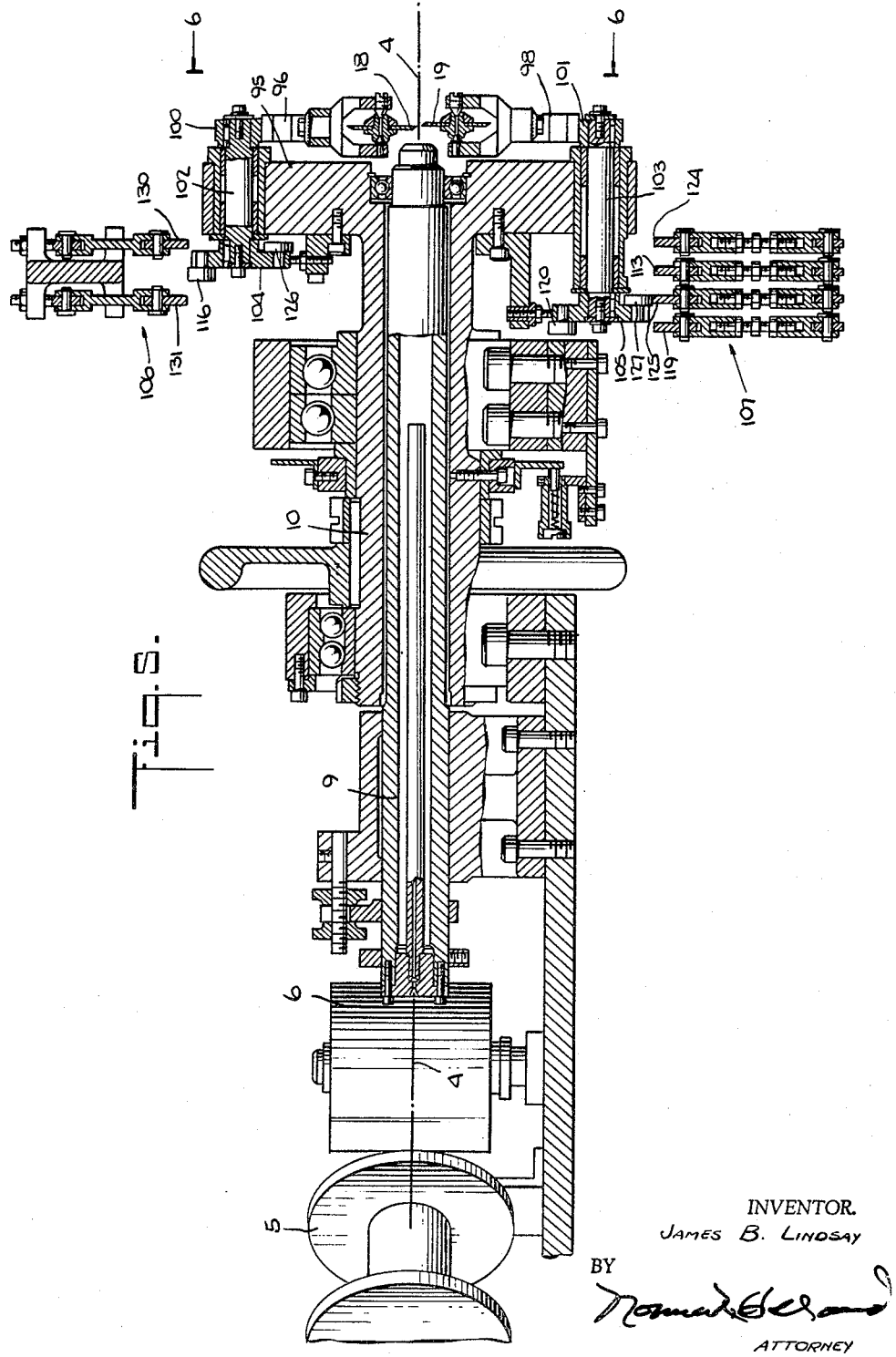

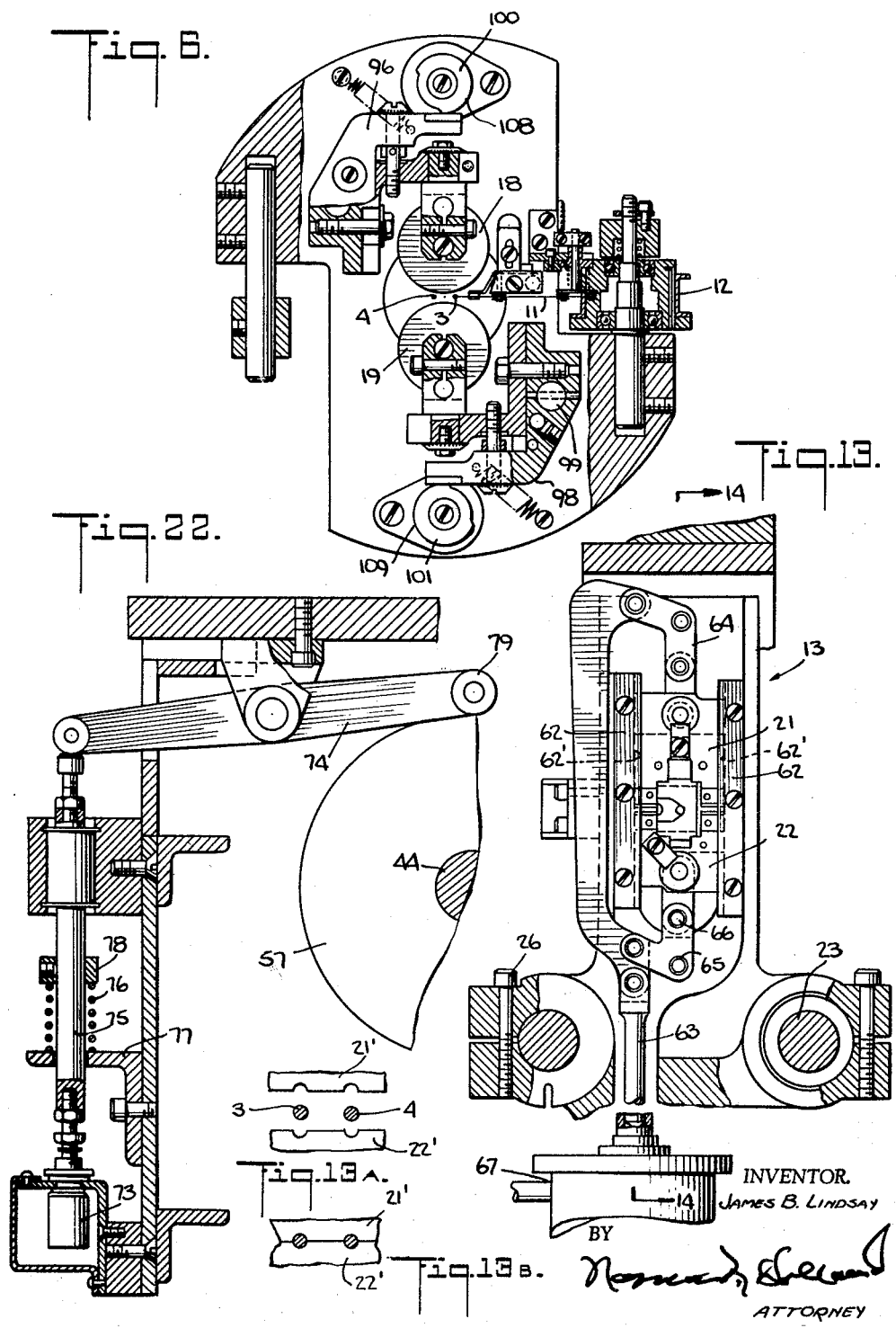

Feb. 23, 1965  J. B. LINDSAY  3,170,494
GRID WINDING MACHINE
Filed June 30, 1961  12 Sheets-Sheet 7
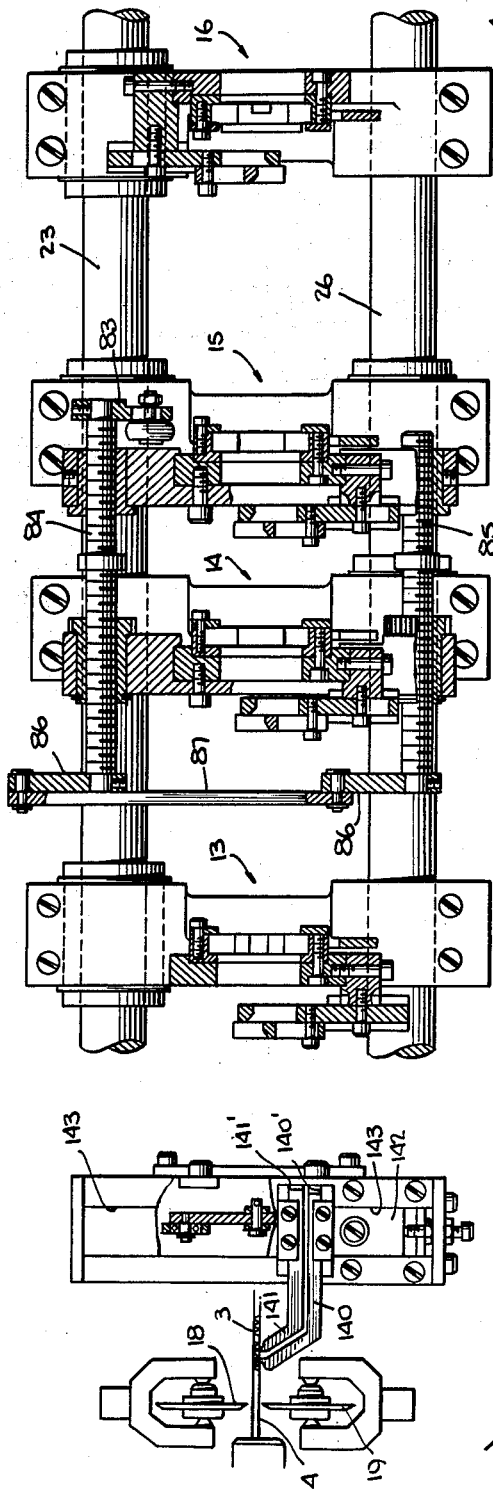
Fig. 21.
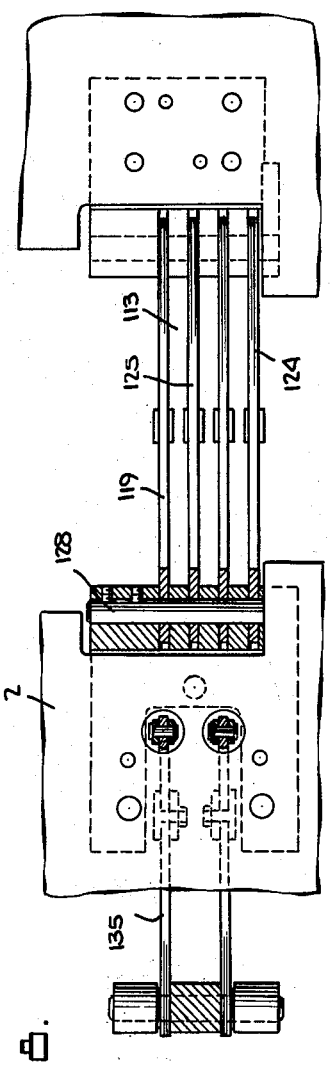
INVENTOR.
JAMES B. LINDSAY
BY
ATTORNEY Feb. 23, 1965 J. B. LINDSAY 3,170,494
GRID WINDING MACHINE
Filed June 30, 1961 12 Sheets-Sheet 8
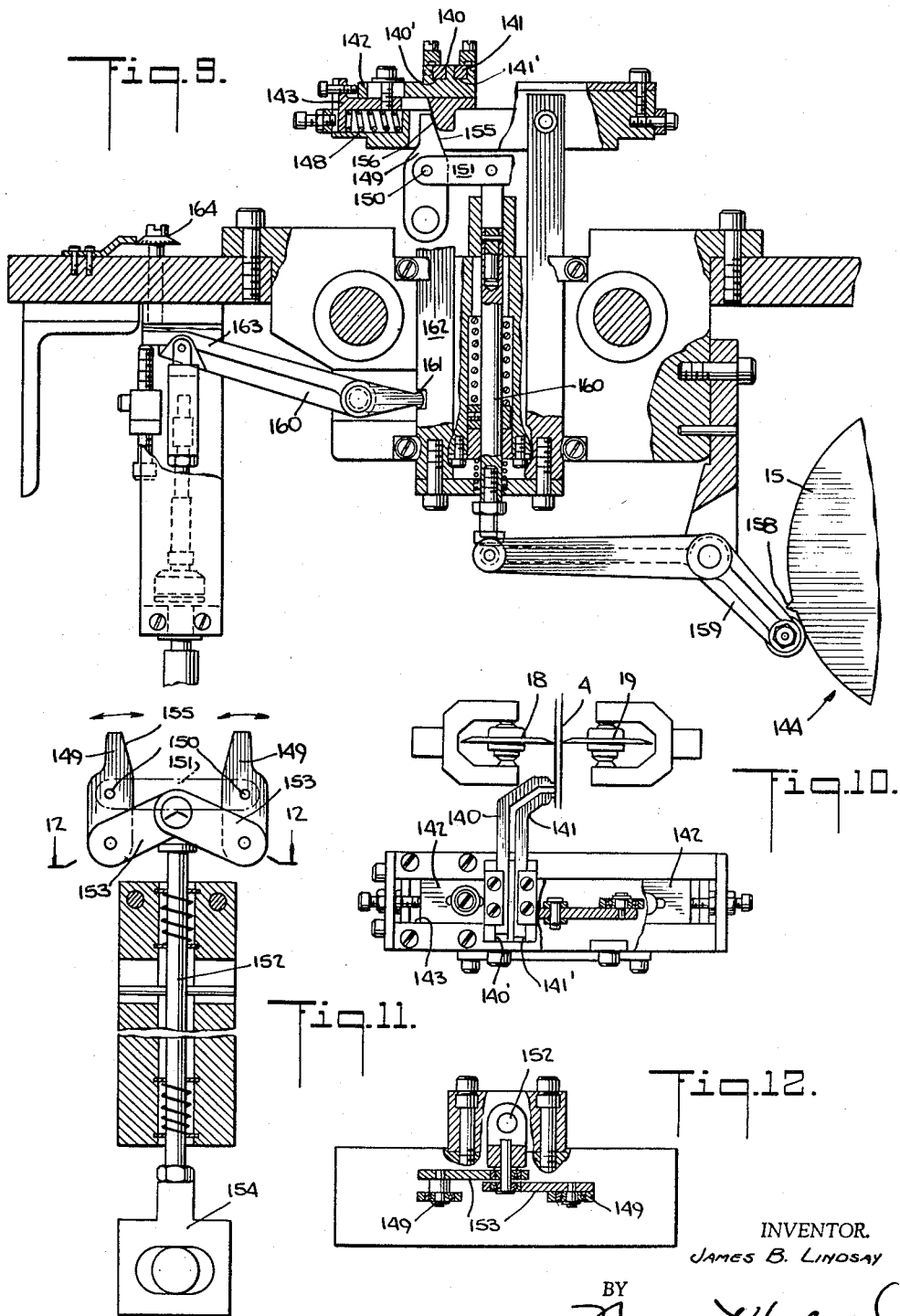
INVENTOR.
JAMES B. LINDSAY
BY
ATTORNEY Feb. 23, 1965   J. B. LINDSAY   3,170,494
GRID WINDING MACHINE
Filed June 30, 1961   12 Sheets-Sheet 9
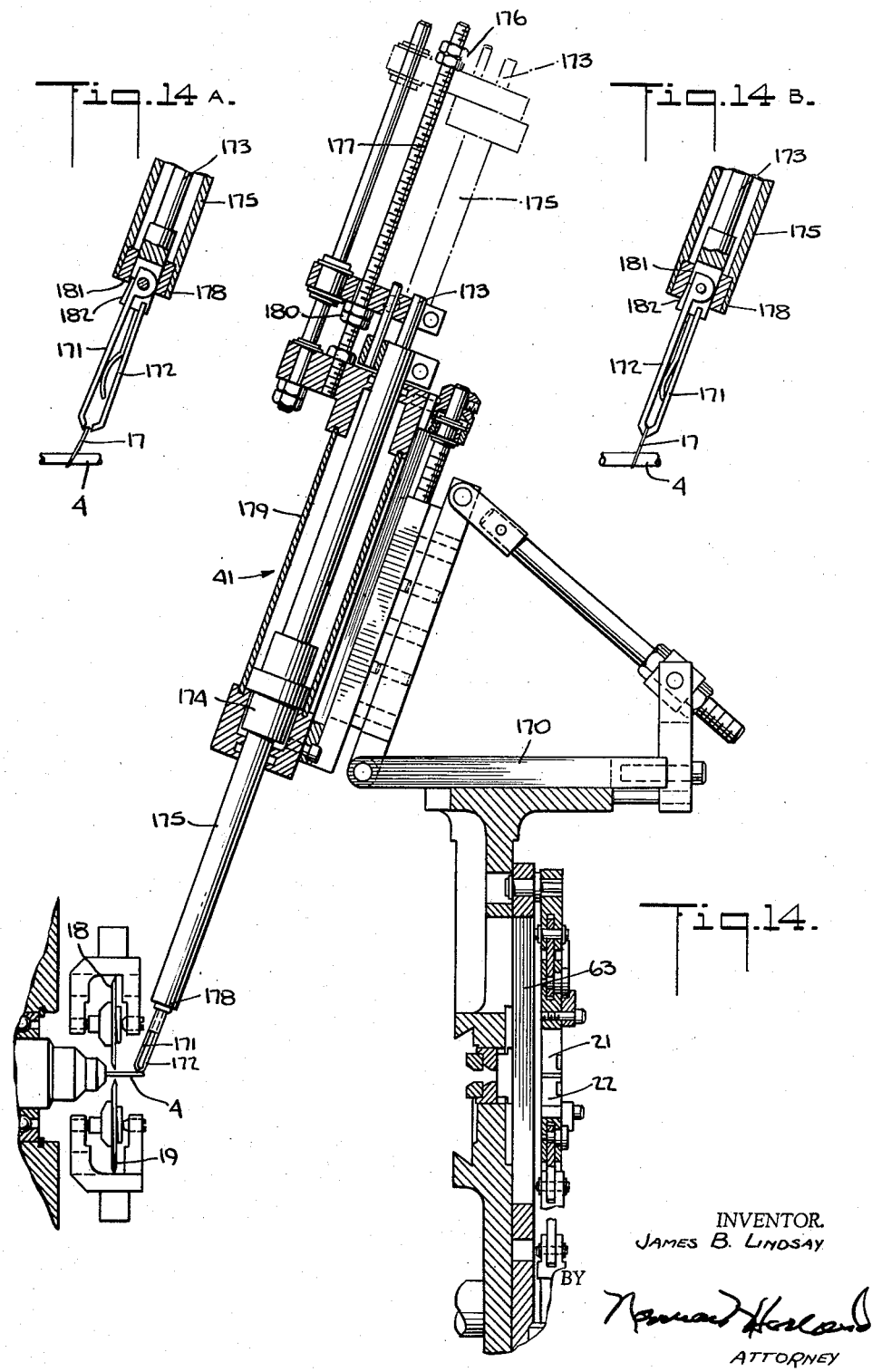
INVENTOR.
JAMES B. LINDSAY
BY
ATTORNEY

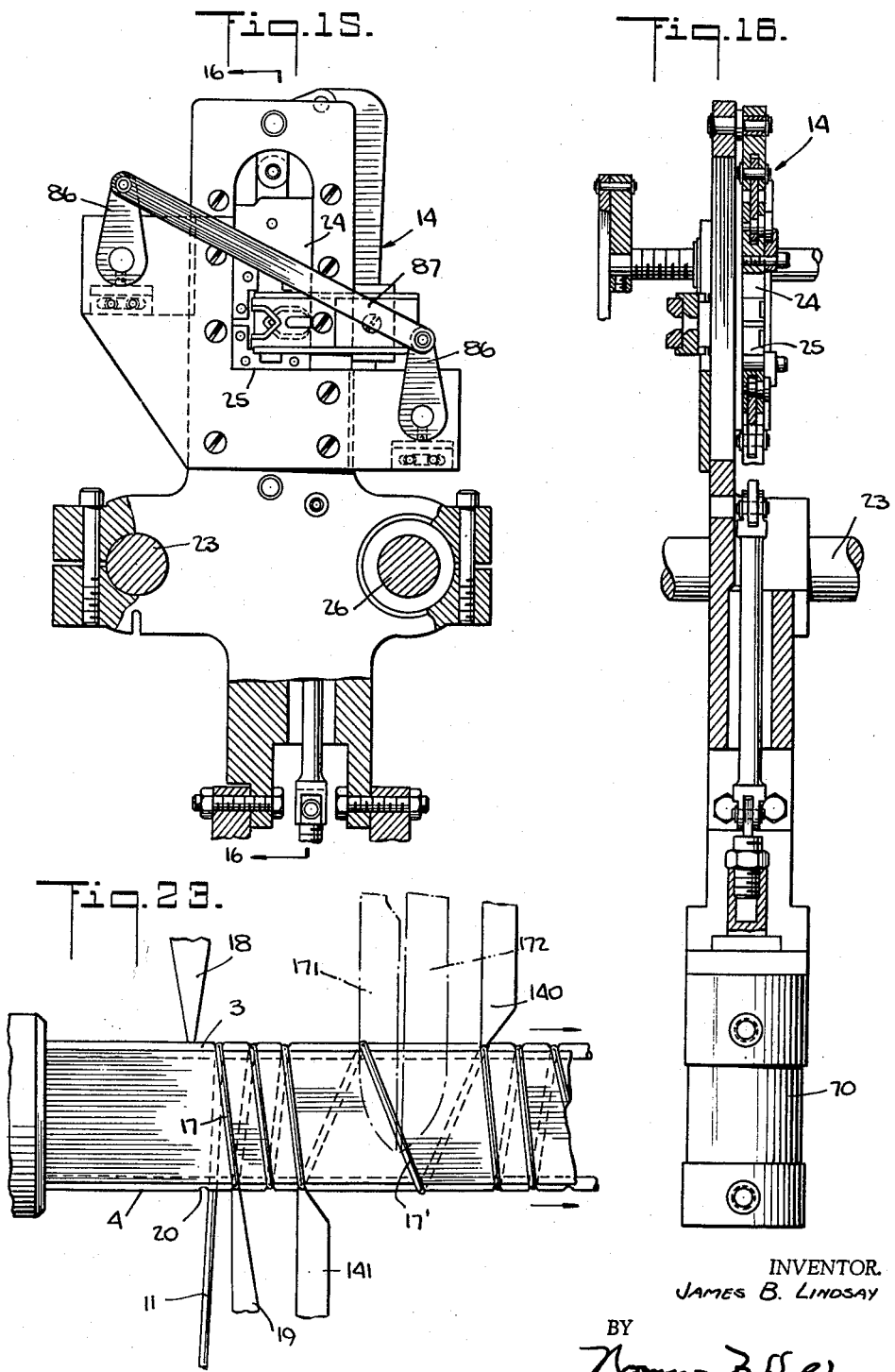

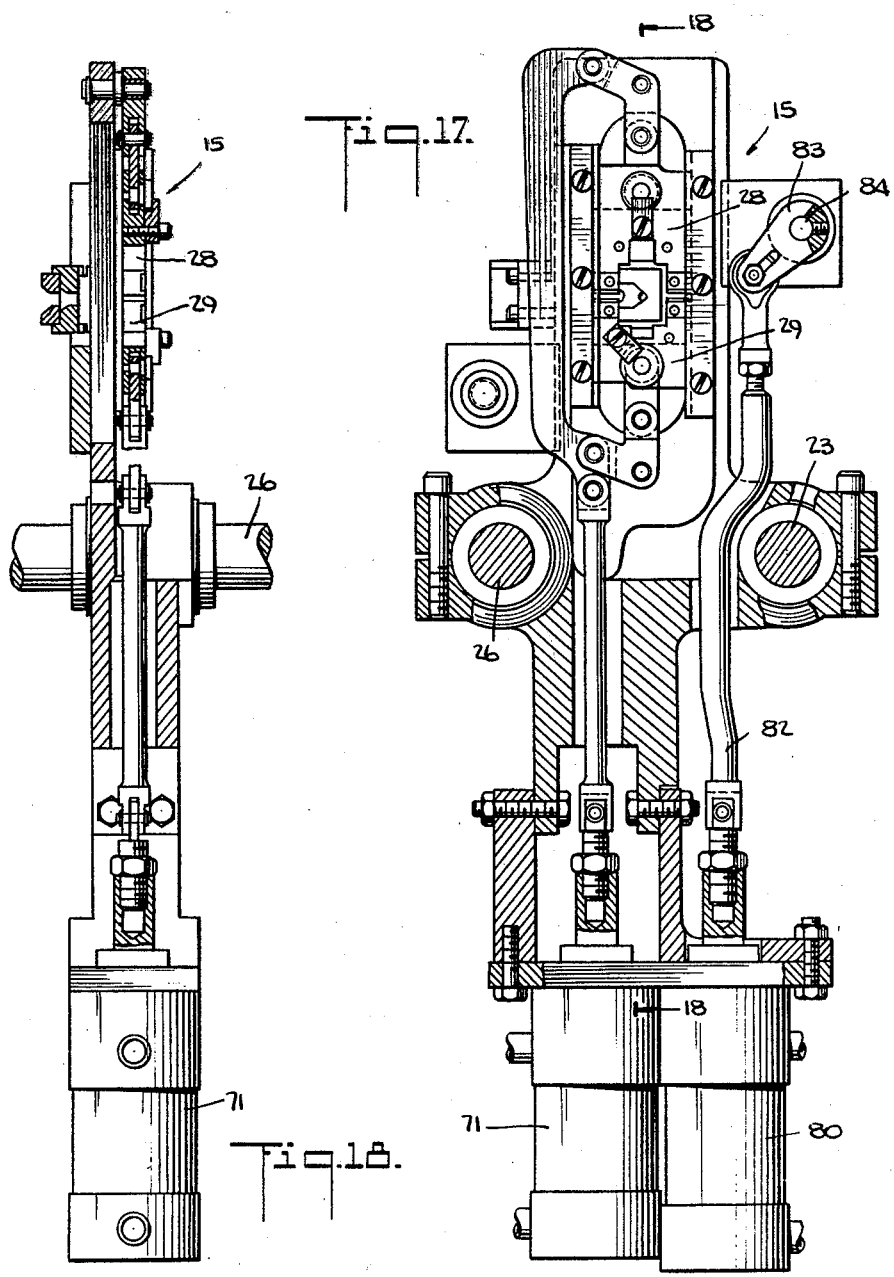

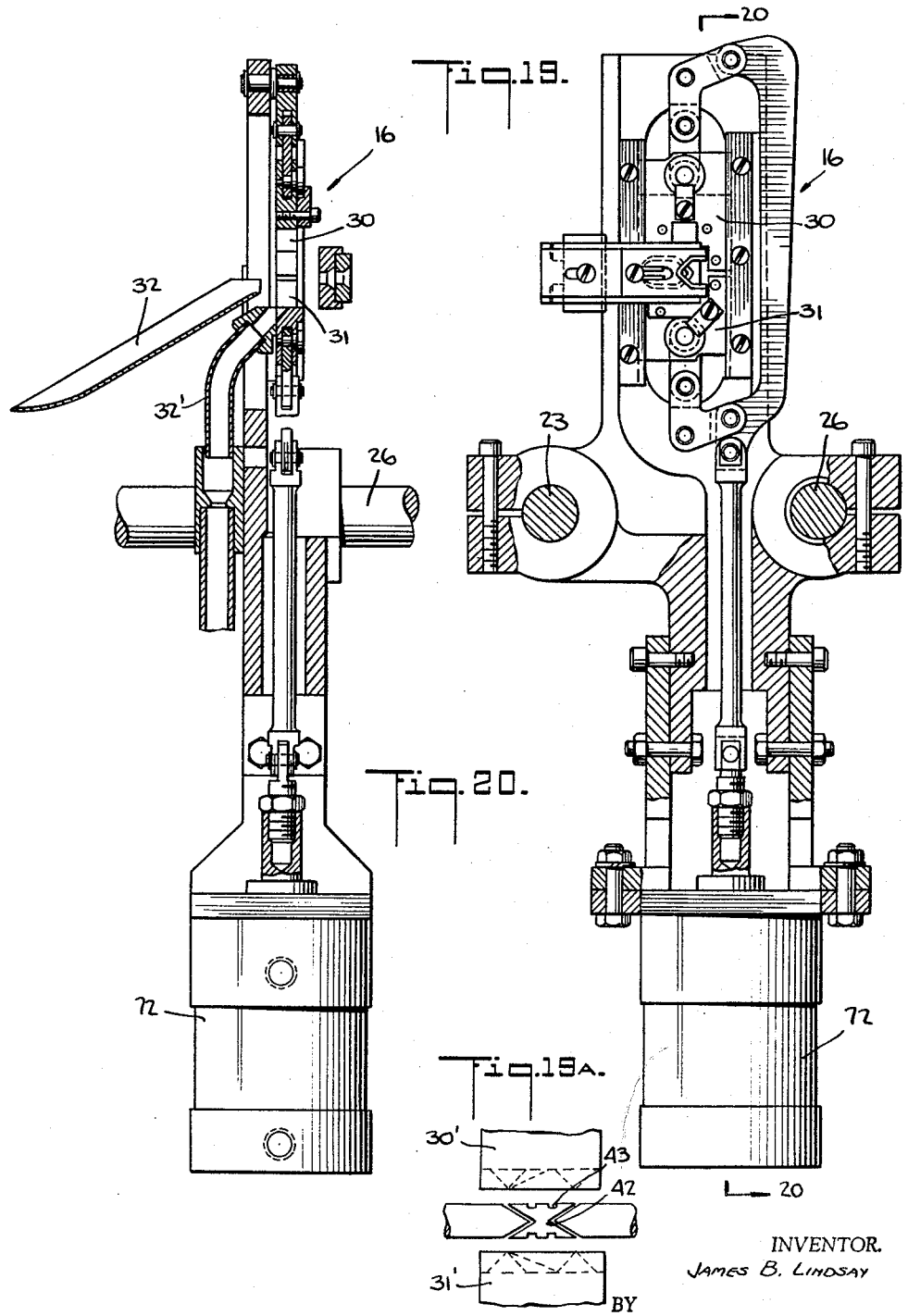

United States Patent Office 3,170,494
Patented Feb. 23, 1965

3,170,494
GRID WINDING MACHINE
James B. Lindsay, Millburn, N.J., assignor to Kahle Engineering Company, Union City, N.J., a corporation of New Jersey
Filed June 30, 1961, Ser. No. 121,157
7 Claims. (Cl. 140—71.5)

The present invention relates to a machine for automatically winding grids for electron vacuum tubes and similar devices and more particularly to an improved machine for winding grids at high speed with great precision in a variety of forms or styles.

Automatic grid winding machines of this general type are well known where a pair of spaced side wires are drawn through a lathe-like machine while being rotated so that a helically disposed grid winding is applied to the moving and rotating side wires. In the present machine, the handling of the side wires is facilitated and simplified and the uniformity and tolerances of the grid dimensions are improved by drawing the side wires through the machine without rotation and by causing the grid wire to be wound about the side wires.

In order to attach the grid wires to the side wires, it is customary to notch the side wires and to place the grid wire into the notches and to subsequently plough or peen the notched material around the grid wire to hold it in place. The present grid winding machine has an improved and simplified control system for these notching and peening tools which is easily adjusted for different styles of grids and which is uniquely adapted for rapid re-adjustment from one grid style to another. The improved machine also embodies an improved loose-turn pick-off device for removing the unused turns between the adjacent grids.

Accordingly, the object of the present invention is to provide an improved, high speed, precision, grid winding machine;

Another object of the present invention is to provide a grid winding machine with a simplified and readily adjustable tool control system for setting the style of the grid to be wound;

Another object of the present invention is to provide an improved grid winding machine of the type having the grid wire spool and the notching and peening tools rotate about non-rotating side wires;

Another object of the present invention is to provide an improved grid winding machine with a more effective loose-turn pick-off device;

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein FIG. 1 is a side elevational view of a preferred embodiment of the grid winding machine in accordance with the present invention;

FIG. 2 is a vertical sectional view of the grid winding machine illustrating the drive system and cam shaft;

FIG. 3 is a vertical sectional view of the drive system taken along line 3—3 of FIG. 2;

FIG. 4 is an enlarged plan view partially in section of the spindle and the side wire supply spools of the grid winding machine;

FIG. 5 is a vertical sectional view taken along line 5—5 of FIG. 4;

FIG. 6 is a vertical sectional view taken along line 6—6 of FIG. 5;

FIG. 8 is a horizontal sectional view of the tripper bars taken along line 8—8 of FIG. 7;

FIG. 9 is a vertical sectional view of the grid wire cutting tools taken along line 9—9 of FIG. 1;

FIG. 10 is a fragmentary detailed plan of the cutting knives and the notching and peening wheels;

FIG. 11 is a detailed elevational view of the cutting tool actuating mechanism;

FIG. 12 is a horizontal sectional view taken along line 12—12 of FIG. 11;

FIG. 13 is a vertical sectional view of the side wire drive head taken along line 13—13 of FIG. 1;

FIGS. 13A and 13B are enlarged detailed views of a pair of gripping jaws for a head member in open and closed position respectively;

FIG. 14 is a vertical sectional view taken along line 14—14 of FIG. 13 showing the loose-turn pick-off;

FIGS. 14A and 14B are enlarged detailed views of the pick-off jaw in opened and closed position respectively;

FIG. 15 is a vertical sectional view taken along line 15—15 of FIG. 1 showing the skip space head;

FIG. 16 is a vertical sectional view of the skip space head taken along line 16—16 of FIG. 15;

FIG. 17 is a vertical sectional view taken along line 17—17 of FIG. 1 showing the stretching head;

FIG. 18 is a vertical sectional view of the stretching head taken along line 18—18 of FIG. 17;

FIG. 19 is a vertical sectional view taken along line 19—19 of FIG. 1 showing the cutting head;

FIG. 19A is an enlarged detailed view of the cutting tools in the cutting head;

FIG. 20 is a vertical sectional view of the cutting head taken along line 20—20 of FIG. 19;

FIG. 21 is a horizontal sectional view of the heads taken along line 21—21 of FIG. 1;

FIG. 22 is a vertical sectional view of the cam shaft taken along the line 22—22 of FIG. 1;

FIG. 23 is an enlarged detailed view of the cutting, loose-turned pick-off, notching and peening tools;

FIG. 24 is an enlarged detailed sectional view of the loose-turn cutting tool; and FIGS. 25 and 26 are enlarged plan views of half-turn and full-turn grids respectively as wound on the machine of the present invention.

Figure 7:
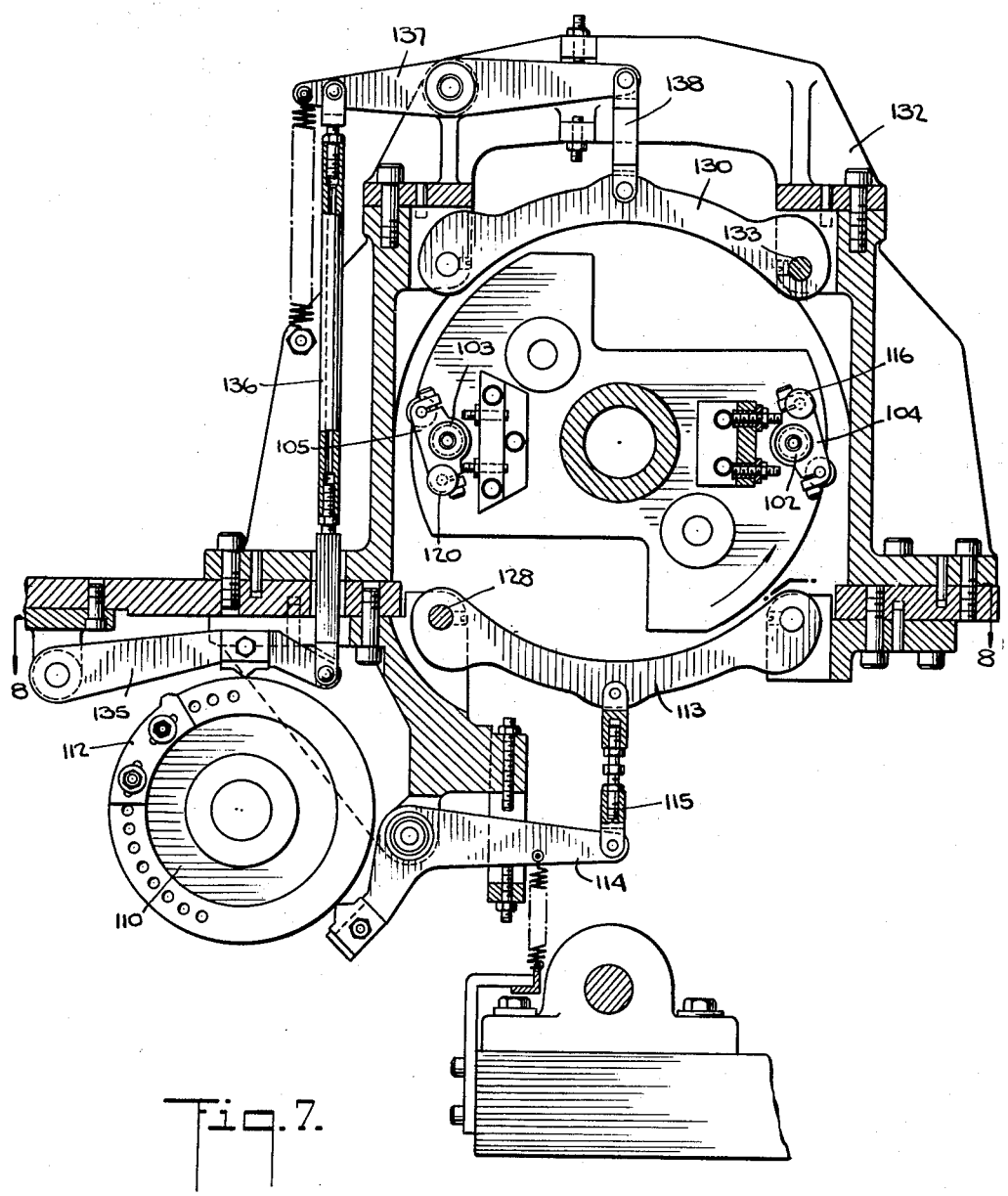
FIG. 7 is a vertical sectional view of the tool control tripper bars taken along line 7—7 of FIG. 1.

The machine first will be described generally with particular reference to FIG. 1 and to the other figures where specifically indicated.

The grid winding machine is mounted on a suitable table 1 having a rigid top plate 2. A pair of side wires 3 and 4 are fed from supply spools 5 (FIG. 4) through the machine from left to right and the individual grids are wound on these moving side wires 3 and 4 by the several grid winding elements mounted on the top plate 2 along the path of the wires 3 and 4 in the manner now to be described. The side wires 3 and 4 are fed by guide rollers 6 (FIG. 4) into spaced conduits 7 in a stationary guide 9. As illustrated in FIG. 5, a spindle 10 is rotatably mounted on guide 9 for rotation about the guide 9 and the side wires 3 and 4. The grid wire 11 which is wound in spiral fashion around the spaced side wires 3 and 4 is supplied from a supply spool 12 (FIGS. 4 and 6) rotatably mounted on the spindle 10 for rotation therewith about the side wires 3 and 4. The side wires 3 and 4 are drawn through the guide member 9 and past the rotating spindle 10 by several moving heads 13, 14, 15 and 16. These heads have a reciprocating motion lengthwise of the top plate 2 and alternate heads intermittently grip the side wires 3 and 4 to provide for a continuous forward movement of the wires 3 and 4.

As the side wires 3 and 4 emerges from the guide 9, the grid wire 11 is wound onto them in the form of a helix by the rotation of grid wire spool 12 about the side wires 3 and 4 on the rotating spindle 10. The grid wire 11 is attached to the side wires by cooperating notching wheel 18 and peening wheel 19 which are mounted on the spindle 10 for rotation about the side wires with the grid wire supply spool 12.

As illustrated in detailed FIGS. 23–26, each individual grid 8 has a series of relatively closely spaced turns of grid wire 17 and the adjacent grids formed on the side wires 3 and 4 are separated by more widely spaced turns as illustrated at 17′. The closely spaced turns 17 on the grids are attached to the side wires 3 and 4 by the action of the notching wheel 18 which cuts a V-shaped notch 20 in the side wires and by the peening wheel 19 which subsequently forces or peens the sides of the notch 20 downwardly into engagement with the grid wire 11 which has been laid into the notch 20 as the spindle 10 rotates around the side wires 3 and 4. The notching wheel 18 and the peening wheel 19 are periodically withdrawn to provide unattached or loose turns 17′ intermediate the individual grids 8 by a novel control system which will be described more fully below.

During the winding of each grid as the grid wire 11 is being attached to the side wires 3 and 4, the side wires 3 and 4 are advanced at a predetermined and constant rate by the grid winding drive head 13. This movement of the side wires 3 and 4 is accomplished by causing the side wires 3 and 4 to be gripped between gripping tools 21′ and 22′ (FIGS. 13A and 13B) in gripping jaws 21 and 22 on the head 13 (FIG. 13) and by moving the head 13 along the top plate 2 through the intermediation of its interconnected turns per inch (t.p.i.) shaft 23 as will be described below. When the head 13 has moved a predetermined distance corresponding to the length of the individual grid being wound, the gripping jaws 21 and 22 are open and the head 13 is returned by the t.p.i. shaft 23 preparatory to the winding of the next successive grid. Meanwhile, the second or skip space head 14 has engaged the side wires 3 and 4 by means of movable jaws 24 and 25 (FIG. 15) and skip space head 14 continues the forward motion of the side wires 3 and 4 at a greater speed under the control of its interconnected skip space shaft 26. While the side wires 3 and 4 are being moved more rapidly by head 14, more widely spaced turns 17′ are wound and the notching and peening wheels 18 and 19 are moved away from the side wires 3 and 4 so that the turns 17′ remain unattached to the side wires 3 and 4.

Immediately after the formation of the loose turn 17′, the side wires 3 and 4 are released by the skip space head 14 and they re-engaged by the grid winding drive head 13 to repeat the grid winding cycle to form the turns 17 of the next successive grid. During the winding of the next grid, the skip space head 14 is returned towards the grid winding drive head 13 to be in position for its next skip space movement. After the completion of each loose turn 17′, both ends of the loose turn are cut to free the loose turn 17′ by a pair of independently adjustable knives 140 and 141 (FIGS. 10 and 23). As the knives 140 and 141 cut the turns 17′ free, the loose turn pickoff 41 (FIG. 14) which is mounted on the grid winding drive head 13 for movement therewith grasps the loose turn 17′ and carries it to a suitable discharge chute.

A third side wire gripping head 15 is associated with the skip space head 14 for the purpose of providing a stretching action on the side wires 3 and 4 engaged between jaws 24 and 25 on the skip space head 14 (FIG. 15) and the jaws 28 and 29 on the stretching head 15. This stretching of the side wires is provided to straighten the grids and to form a more rigid grid structure which results from the cold working of the side wires during the stretching action. The stretching action is provided by a supplemental screw system connecting the heads 14 and 15 as will be more fully described in the following description of the drive system for the various parts of the machine.

The fourth head 16 is a cutting head which connected to the t.p.i. shaft 23 to move in synchronism with the grid winding drive head 13. Cutting head 16 (FIG. 19) has a pair of cutting jaws 30 and 31 movably mounted thereon which cut the side wires 3 and 4 to form the individual grids. Preferred cutting tools 30′ and 31′ for cutting jaws 30 and 31 are illustrated in FIG. 19A. These cutting tools form a beveled end on the side wires and removed a portion 42 which preferably has been located to contain any gripping marks 43 from the jaws of the prior heads 13–15. The completed and cut grids 8 pass downwardly from cutting head 16 to a suitable storage device through chute 32 (FIG. 20) and the cut out portions drop into chute 32′.

*Drive system*

The drive system for the machine is illustrated in FIGS. 1–3 and includes a suitable variable speed drive motor 33. Drive motor 33 is coupled to an intermediate drive shaft 34 by sprockets 35 and 36 and chain 37. The spindle 10 which rotates about the stationary guide 9 to rotate the notching and peening tools 18 and 19 and the grid wire spool 12 is driven from the intermediate drive shaft 34 by sprockets 38 and 39 and chain 40.

As described above, the spaced heads 13 and 16 simultaneously grip the side wires 3 and 4 and draw them through the stationary guide 9 as the grid wire 11 is turned onto the side wires. Heads 13 and 16 move the side wires 3 and 4 forward as an individual grid 8 is wound onto them. When the winding is completed, heads 13 and 16 release the side wires 3 and 4 and they are returned towards the rotating spindle 10 preparatory to the winding of the next successive grid. As side wires 3 and 4 are released by heads 13 and 16, the side wires are gripped by skip space head 14 and the stretching head 15. These heads 14 and 15 continue the forward motion of the side wires 3 and 4 at a more rapid rate until the heads 13 and 16 have been returned to begin the forward motion of the side wires 3 and 4 for the winding of the next grid. This reciprocating motion of the grid winding drive head 13 and the cutting head 16 is provided for by attaching both heads 13 and 16 to the slidably mounted horizontal t.p.i. shaft 23. The skip space head 14 and the stretching head 15 are connected together and are driven to provide a supplemental side wire motion by an attachment between the skip space drive shaft 26 and the skip space head 14. In the preferred embodiment, the heads 13 and 16 are fixedly attached for movement with the t.p.i. shaft 23 and are slidably mounted on the parallel skip space shaft 26. The head 14 is fixedly mounted on the skip space shaft 26 and is slidably mounted on the t.p.i. shaft 23. The reciprocating motion of the shafts 23 and 26 and the interconnected heads 13–16 is provided from the intermediate drive shaft 34 by a drive coupling which includes an elongated cam shaft 44 rotatably mounted beneath top plate 2 as illustrated in FIG. 1. Cam shaft 44 has one end connected to the intermediate drive shaft 34 through the intermediation of gear reduction box 45 and a gear train illustrated at 46 and has its opposite end 47 coupled to a right angle gear reduction drive box 51 (FIG. 3). The output shaft 52 of the drive box 51 has a cam mounting hub 53 connected to it and inner cam 54 on the hub 53 reciprocates skip space shaft 26 through the intermediation of cam roller 55 and an outer cam 56 reciprocates the t.p.i. shaft 23 through the intermediation of a similar cam roller. It thus is seen that the synchronized reciprocating movement of the t.p.i. shaft 23 and the skip space shaft 26 to provide for a continuous forward movement of the side wires 3 and 4 at successive high and low rates is provided by suitably shaped cams 54 and 56 which are mounted on the rotating hub 53.

The operation of each of the other driven portions of the machine is synchronized with the movement of the heads 13–16 by being controlled by a series of cams mounted on the aforementioned elongated cam shaft 44. The opening and closing of the gripping jaws on heads 13, 14 and 15 as well as the operation of the cutting jaws on the cutting head 16 are controlled by the cams 57 through 60 mounted on shaft 44 as illustrated in FIG. 2. The coupling between the cam 57 and the grid winding drive head 13, jaws 21 and 22 is similar to the coupling between cams 58–60 and their respective wire gripping jaws and is illustrated in FIGS. 13 and 22.

As illustrated in FIG. 13, the upper jaw 21 and the lower jaw 22 are slidably mounted in side bars 62 in slots 62' on opposite sides of the head 13. The opening and closing movement of the jaws 21 and 22 is provided by a vertical drive rod 63 which is coupled to the upper jaw 21 by crank 64 and to the lower jaw by link 65. When the rod 63 is moved upwardly, the crank 64 pivots in a clockwise direction about the pin 66 to lower jaw 21 while link 65 is raised to close the jaws 21 and 22. Downward movement of the rod 63 causes a counterclockwise rotation of the crank 64 and a lowering of link 65 to open the jaws 21 and 22 so that they release the side wires 3 and 4.

The vertical movement of the rod 63 is provided by the air cylinder 67. The air cylinder 67 has a conventional air operated piston having an electric solenoid operated control valve. The solenoid for the air cylinder 67 is controlled by the cam 57 mounted on the cam shaft 44 as illustrated in FIG. 22. The cam 57 opens and closes an electric switch 73 coupled to the solenoid of the air cylinder 67 to raise and lower the piston rod 63 at appropriate intervals through the intermediation of a cam follower 79 mounted on the inner end of the cam follower arm 74. A connecting rod 75 couples the arm 74 to the switch 73 as illustrated in FIG. 22. The rod 75 is normally held in an upward position by spring 76 compressed between the mounting flange 77 and adjustable stop 78 on the connecting rod 75.

The cams 58–60 are similarly coupled to air cylinders 70–72 to operate the jaws of the heads 14–16 at the proper intervals to provide for the above described forward movement of the side wires and the grid cutting operation. An additional air cylinder 80 is also employed in the preferred embodiment to accomplish the side wire stretching operation by causing head 15 to be moved away from head 14 as the two heads are simultaneously moved along the top 2 of the grid winding machine under the control of the skip space shaft 26. This relative movement to increase the spacing between the heads 14 and 15 is provided by the stretching means illustrated in FIGS. 15–17 and FIG. 21. As illustrated in FIG. 17, the air cylinder 80 which is controlled by a cam 61 on cam shaft 44 by a control as described above for the jaws of the head 13 is coupled by means of vertical connecting rod 82 to a crank 83. The crank 83 is mounted on one end of a threaded connecting rod 84 which threadably connects the head 15 to the stretching head 14. Thus, the turning of the crank 83 under the influence of the air cylinder 80 rotates the threaded connecting rod 84 to vary the spacing between the heads 14 and 15 and thus stretches the grid side wires which are simultaneously gripped between jaws 24 and 25 of head 14 and jaws 28 and 29 of head 15. In the preferred embodiment, a second threaded connecting rod 85 is provided at the opposite side of the heads 14 and 15 and the rotation of rod 85 is synchronized with that of the rod 84 by the cranks 86 and connecting arm 87 (FIG. 21). Thus, head 15 which is slidably mounted on both the skip space shaft 26 and the t.p.i. shaft 23 normally moves in exact synchronism with the stretching head 14 as the head 14 is moved by the skip space shaft 26. The stretching action is provided at the proper time by the additional movement of the stretching head 15 away from the skip space head 14 by stretching cam 61 through the operation of the above described coupling.

The tool control system

As more fully described above, the individual grids 8 of a predetermined length are wound as the spindle 10 rotates about the continuously moving side wires 3 and 4. The side wires 3 and 4 are moved past the spindle 10 at one speed during the application of the grid wire 11 to the side wires to form the grid. When the grid wire 11 has been wound about the side wires 3 and 4 the required number of turns, the side wires 3 and 4 are moved at a higher speed to move them forward a predetermined distance to provide leg portions 90 (FIG. 25) on the grids 8 preparatory to the commencement of the winding of the next successive grid. During this more rapid movement, the grid wire 11 continues to be wound about the side wires. However, these turns of grid wire are unattached to the side wires and are later removed so that the notching wheel 18 and peening wheel 19 are swung clear of the side wires 3 and 4 during the formation of the leg portions between the grids.

The fully mechanical cam controlled system for moving the notching and peening wheels in and out of their operative positions will now be described with particular reference to FIGS. 4 through 8.

The notching wheel 18 and the peening wheel 19 are mounted for rotation around the side wires 3 and 4 on the rotating spindle 10 on a flange 95. As seen in FIG. 4, the notching wheel 18 is rotatably mounted on arm 96 which is pivotally attached to the flange 95 by being mounted on one end of a shaft 97. The peening tool 19 is similarly mounted on an arm 98 (FIG. 6) which is attached at one end to the mounting shaft 99. Rotation of the notching wheel 18 and the peening wheel 19 on the shafts 97 and 99 provides for the movement of these tools toward and away from the side wires 3 and 4 under the control of tool positioning cams 100 and 101 respectively (FIG. 5).

As illustrated in FIG. 5, cams 100 and 101 are rotatably mounted on the flange 95 on shafts 102 and 103. On the opposite end of these shafts 102 and 103, cam throw arms 104 and 105 respectively are mounted in position to move the cams 100 and 101 between their operative and inoperative positions under the control of the upper tripper bars 106 and the lower tripper bars 107 as will now be more fully explained.

FIG. 6 illustrates the cams 100 and 101 in their operative positions with their raised portions 108 and 109 engaging the notching and the peening wheel arms 96 and 98 so that the arms have moved the wheels so that they engage the side wires 3 and 4 to perform their wire fastening operation.

The operation of the tripper bars 106 and 107 is controlled by a notching cam wheel 110 and a peening cam wheel 111 mounted on the cam shaft 44. These cam wheels 110 and 111 are set to control the operation of the tripper bars to provide either a half turn grid as illustrated in FIG. 25 or a full turn grid as illustrated in FIG. 26. Their operation will first be described in connection with the winding of a half turn grid as illustrated in FIG. 25 where the grid wire 11 is fastened on side wire 4 at the beginning of the winding and is fastened on side wire 3 at the termination of the winding. In order to achieve this result with the machine running in clockwise sense as illustrated in FIG. 6, it is necessary for the notching wheel 18 and the peening wheel 19 to be moved to their operative position on the lower half of their rotation as they approach side wire 4 from below so that the grid wire attachment starts on side wire 4. This is done by mounting a notching cam 112 on the notching cam wheel 110 (FIG. 7) in position so that it momentarily swings the lower notching tripper bar 113 upwardly about pin 128 through the intermediation of the cam follower crank 114 and the vertical connecting rod 115. This momentarily raises the notching tripper bar 113 so that it strikes the roller 116 on the throw-arm 104 thereby rotating cam 102 to its operative position as illustrated in FIG. 6. As the peening wheel 19 follows the notching wheel 18 through the lower half of its rotation below the side wires 3 and 4, it is similarly moved to its operative position by the suitable positioning of a peening cam 118 on the peening cam wheel 111 which swings the peening tripper bar 119 in the manner described above so that it momentarily engages the roller 120 on the throw-arm 105 to turn the peening cam 101 to its operative position.

The notching wheel 18 and the peening wheel 19 remain in their operative positions until the required number of turns of grid wire 11 have been attached to the side wires 3 and 4 to form a grid. It is then necessary for the notching wheel 18 and the peening wheel 19 to be swung outwardly to their inoperative position to provide the loose turn 17'. This is done by positioning a second notching cam 122 (FIG. 2) on the notching cam wheel 110 and a second peening cam 123 on the peening cam wheel 111 so that they momentarily raise the notching tripper bar 124 and the peening tripper bar 125 respectively to engage the roller 126 on the throw-arm 104 to swing the notching cam 100 to its inoperative position and the roller 127 on the throw-arm 105 to swing the peening cam 101 to its inoperative position. These second cams 122 and 123 which swing the notching wheel 18 and the peening wheel 19 to their inoperative positions are positioned just slightly in advance of the above described cams 112 and 118 so that the cams 112 and 118 operate as described above to swing the notching wheel 18 and peening wheel 19 back to their operative positions after the loose turn 17 has been completed and so that the formation of the next successive grid is then started with its first turn attached to side wire 4. The symmetrical tripper bars provide for grid winding in either direction since the pins 128 and 133 may be slipped into similar holes in either end.

When a full turn grid is being wound as illustrated in FIG. 26, it is necessary to have the notching and peening wheels swing to their inoperative position in the upper half of their rotation as they move downwardly toward side wire 3 (FIG. 6) as the first unattached turn is on the side wire 3. This is done by providing two tripper bars 130 and 131 at the top side of the tripper bar frame 132. When these tripper bars 130 and 131 are used to form a full turn grid, the notching cam 122 on the notching cam wheel 110 and the peening cam 123 on the peening cam wheel 11 are repositioned to momentarily swing the tripper bars 130 and 131 downwardly on pin 133 by cam follower 135, rod 136, crank 137 and link 138, as the rollers 126 and 127 move through the upper portion of the spindle rotation so that the rollers 126 and 127 are engaged to swing notching cam 100 and peening cam 101 to their inoperative positions. The notching wheel 18 and the peening wheel 19 are returned to their operative position at the beginning of the next turn and after the completion of loose turn 17 by the above described tripper bars 113 and 119. When the upper tripper bars are being used in this fashion, the cam follower arms associated with the lower tripper bars are disengaged.

*Loose turn cutting tools*

As described more fully above, the individual grids 8 are wound onto the side wires 3 and 4 as the side wires 3 and 4 are moved past the spindle 10 a distance corresponding to the grid length. After the side wires 3 and 4 have been moved this distance by the t.p.i. shaft at a speed suitable to provide the required number of turns for the grid, the side wires 3 and 4 are released by the grid winding drive head 13 and the side wires 3 and 4 are engaged and are moved at a higher speed by the skip space head 14 to provide for the necessary side wire spacing required before the next successive grid is started. During this more rapid movement, the spindle 10 continues to rotate and a turn called a loose turn 17 is formed between the end of one grid and the beginning of the next grid. This turn is loose and unattached to the side wires as described above.

It is necessary in completing the manufacture of each grid 8 that this loose turn be cut free at both ends from the adjacent side wires to insure the complete separation of the grids and to eliminate unsuitable loose grid wire from the ends of each grid. For this purpose, a pair of cutting tools 140 and 141, FIG. 21, are rapidly swung against the side wires 3 and 4 so that they pass through the grid wire 11 at a point just behind the attachment for the last turn on the side wire as illustrated in detail for knife 140 in FIG. 24. These knives 140 and 141 are separately mounted for individual adjustment in slots 140' and 141' on a slidable carriage 142 on a suitable support track 143 as illustrated in FIGS. 9 and 21 and the drive means for intermittently sliding the carriage 142 inwardly for the cutting operation is controlled by a mechanical drive system operated by cam 144 on cam shaft 44 as illustrated in FIGS. 9 and 11.

As illustrated in FIG. 10, the support track 143 has duplicate carriages 142 mounted on opposite sides of the side wires 3 and 4 to permit a knife to be mounted on either side of wires so that the turns of grid wire may be cut either at side wire 3 or side wire 4 depending on whether a full turn grid is to be wound as illustrated in FIG. 26 or a half turn grid is to be wound as illustrated in FIG. 25. When a full turn grid is wound as illustrated in FIG. 26, the grid wire 11 is cut at points 145 and 146 both on side wire 4. When a half turn grid is formed, one cut is made at point 145 and the other made at point 147 on side wire 3.

In order to provide for a rapid and precise cutting stroke to sever both ends of the loose turn 17 on the moving side wires, the preferred embodiment of the drive means for the knives has a compound actuator. This includes a device for providing a continuous high speed oscillating movement of the knives towards the side wires as illustrated in FIG. 11 and a supplementary trigger system adapted to provide a similar inward movement of the knives to perform the actual cut when required. As illustrated in FIG. 9, the knife holders 142 are slidably mounted on the track 143 and they are resiliently held outwardly away from the side wires by compressed coil spring 148. The carriages 142 are vibrated continuously towards the side wires 3 and 4 by a pair of rocking fingers 149 pivotally mounted at 150 on mounting bar 151. Each of the fingers 149 is rocked about its pivot 150 by a crank arm 152 coupled to the lower ends of the fingers 149 by links 153 and having its lower end coupled to eccentric 154 mounted on the end of the drive shaft 34 as illustrated in FIG. 1. The rocking motion of the fingers 149 is transmitted to the knives 140 and 141 through the contact between the cam surface 155 on the finger 149 and cam surface 156 on the carriage 142. When it is desired to cut a loose turn 17' from the side wires 3 and 4, the mounting arm 151 for the fingers 149 is raised by the trigger mechanism as illustrated in FIG. 9. The trigger mechanism includes a cam wheel 157 mounted on a cam shaft 44 and having a cutting cam 158 positioned to rock crank 159 in a clockwise direction thereby lifting the slidably mounted support post 160 for the arm mounting arm 151.

This causes the sloping cam surfaces 155 on the fingers 149 to ride upwardly on the complementary cam surface 156 of the carriage 142 to cause them to move closer to the side wires 3 and 4 as they continue to oscillate under the influence of the rocking fingers 149. This temporary inward movement by the trigger means causes the knives to strike the grid wire 11 and to sever the ends of the loose turn 17'.

A fine adjustment is provided for the height of the knives 140 and 141 by the adjustable support arm 160 which engages a notch 161 in the support 162 for the track 143 and which has the height of its outer end 163 adjustably set by threaded dial member 164.

The grid winding machine as described herein is particularly well adapted for winding extremely fine grids which may have as many as 500 t.p.i. Cutting the loose turns at the side wires for such grids is a delicate operation and the fine height adjustment and the individual adjustment of the separate cutting knives 140 and 141 facilitate the cutting operation. The separate adjustment for knife 140 or 141 also permits the removal or readjustment of one knife without requiring a time consuming readjustment of the other.

Loose turn pick-off means

As each loose turn 17' is freed from the side wires by the action of the above described cutting knives 140 and 141, the loose turn pick-off 41 which will now be described grips the loose turn 17' and carries it to a discharge point where it is dropped onto a discharge chute preferably being directed into the chute by a blast of air from a suitably positioned nozzle. The pick-off means 41 illustrated generally at 41 in FIG. 1 is illustrated in detail in FIGS. 14, 14A and 14B.

Loose turn pick-off 41 is mounted on a suitable platform 170 provided on top of the grid winding drive head 13. This causes the loose pick-off 41 to move with the side wires 3 and 4 so that there is no relative motion between the loose turn pick-off 41 and the loose turn 17' during the cutting and pick-off operation which is performed as the next successive grid 8 is being wound.

The loose turn 17' is engaged by a pair of jaws 171, 172 mounted at the lower end of the pick-off rod 173. This rod 173 is moved downwardly to its pick-off position by an air cylinder including a reciprocable piston 174 which carries the pick-off rod 173 with it as it moves from its downward position as illustrated in FIG. 14 in solid lines to its upper position in dash-dot lines.

The opening and closing of the jaws 171 and 172 is performed by an axial movement of the piston rod 175 of the air cylinder with relation to the pick-off rod 173 at the bottom of the pick-off stroke as illustrated in detail FIGS. 14A and 14B. Thus, when the piston rod 175 is in its upper position, the adjustable stop member 176 on the threaded rod 177 causes the piston rod 175 to slide upwardly on the pick-off rod 173 so that the lower end 178 of the piston rod 175 moves away from the jaws 171 and 172 as illustrated in FIG. 14A. When the air cylinder 179 moves the piston rod 175 and the pick-off rod 178 downwardly to its lower position as illustrated in FIG. 14B, the lower stop member 180 terminates the downward motion of the pick-off rod 173 before the piston rod 175 reaches its lowermost position. This causes the lower end 178 of the piston rod 175 to move downwardly over the jaws 171 and 172 as illustrated in FIG. 14B thereby causing the camming ring 181 to engage cam 182 on the pivotally mounted jaw member 171 so that it swings shut on the loose turn 17' as illustrated in FIG. 23. When the air cylinder 179 raises piston rod 175, the loose turn 17' is carried upwardly until the pick-off rod 173 strikes the upper stop 176 causing the piston rod 175 and the camming ring 181 to move off of the cam 182 thereby opening the jaws 171 and 172 and dropping the loose turn 17' into a discharge chute. The air cylinder 179 is controlled by a suitable two-way electrically controlled air valve operated by the cam 182 (FIG. 2) on cam shaft 44 which opens and closes an air valve control switch by a cam follower rod which may be similar to the above described connecting rod 75 for the jaws of the heads 13–16.

It will be seen that the present invention provides an improved grid winding machine with improved mounting of the notching and peening tools and with precision tool control means adapting to provide quite running, high speed and close tolerance grid winding. The machine is particularly adapted to form closely spaced grid windings such as, for example, grids having as many as 500 t.p.i. and the improved tool mounting and mechanical tool control permit such grids to be wound at speeds as high as 1000 r.p.m. In addition, the improved tool control provides a readily and relatively simple adjustable means for changing the style of grid being wound.

The machine of the present invention also combines an improved grid cutting and loose turn removal means having individually adjustable loose turn cutter knives. These improvements are provided in a compact and rugged machine which provides trouble free, high speed grid winding operation with a minimum amount of supervision and maintenance.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a grid winding machine the combination of a side wire guide, means to move a side wire through said guide at differing speeds, a spindle mounted for rotation about said guide, grid wire supply means mounted on said spindle for rotation therewith, a plurality of side wire fastening tools, means for movably mounting said tools on said spindle for rotation therewith and for transferring said tools between an operative position in engagement with the side wire and an inoperative position out of engagement with the side wire, first control means for periodically moving said fastening tools to their operative position during the movement of the side wire at one side wire speed, and second control means for periodically moving said fastening tools to their inoperative position during the movement of the side wire at the higher side wire speed.

2. The machine as claimed in claim 1 in which said first control means comprises a generally arcuate member for each of said tools movably mounted generally concentrically with said spindle, and a control cam operatively coupled to said arcuate members for periodically moving said members into engagement with said tool mounting means, and said second control means comprises an additional generally arcuate member for each of said tools movably mounted generally concentrically with said spindle, and a second control cam operatively coupled to said additional arcuate members for periodically moving said members into engagement with said tool mounting means.

3. In a grid winding machine the combination of a side wire guide, means to move a side wire through said guide, a spindle mounted for rotation about said guide, grid wire supply means mounted on said spindle for rotation therewith, a side wire notching tool, a side wire peening tool, means for mounting said notching tool on said spindle for movement between operative and inoperative positions, means for mounting said peening tool on said spindle for movement between operative and inoperative positions, a plurality of generally arcuate tripper members movably mounted generally concentrically of the spindle, a pair of follower means on each of said notching tool mountings and each of said peening tool mountings, means for periodically moving certain of said tripper bars into engagement with one of said follower means on each of said notching and peening tools for providing said tool movement.

4. In a grid winding machine the combination of a side wire guide, means to move a pair of side wires through said guide, a spindle mounted for rotation about said guide, grid wire supply means mounted on said spindle for rotation therewith, a side wire notching tool, a side wire peening tool, means for mounting said notching tool on said spindle for movement between operative and inoperative positions, means for mounting said notching tool on said spindle for movement between operative and inoperative positions, a plurality of generally arcuate tripper members movably mounted generally concentrically of the spindle, a plurality of additional generally arcuate tripper members movably mounted generally concentrically of said spindle and circumferentially spaced from said first arcuate members, a pair of follower means on each of said notching tool mountings and each of said peening tool mountings, control means for periodically moving certain of said first tripper members into engagement with one of said follower means on said tools for moving said tools to their operative position, and second control means for periodically moving said additional tripper members into engagement with the other of said follower means on said tools for disengaging said tools.

5. In a grid winding machine the combination of a side wire guide, means to move a pair of side wires through said guide at different speeds, a spindle mounted for rotation about said guide, a grid wire supply means mounted on said spindle for rotation therewith, a side wire notching tool, a side wire peening tool, means for pivotally mounting said notching tool and said peening tool on said spindle for movement between operative positions and inoperative positions, a plurality of generally arcuate tripper members pivotally mounted generally concentrically of the spindle, a plurality of additional generally arcuate tripper members pivotally mounted generally concentrically of said spindle and circumferentially spaced from said first arcuate members, a pair of follower means on each of said notching tool mountings and each of said peening tool mountings, control means for periodically swinging certain of said first tripper bars into engagement with one of said follower means on said tools for moving said tools to their operative position at one side wire speed, and second control means for periodically swinging said additional tripper members into engagement with the other of said follower means for disengaging said tools at another side wire speed.

6. The machine as claimed in claim 5 which further comprises means for cutting said grid wire at spaced points, and means for picking-off the grid wire intermediate said points.

7. The machine as claimed in claim 5 which further comprises means for cutting said grid wire at spaced points, means for picking-off the grid wire intermediate said points, and said picking-off means being coupled to said side wire moving means whereby its movement is sychronized with the side wire movement.

References Cited in the file of this patent

UNITED STATES PATENTS

| | | |
|---|---|---|
| 1,874,575 | Marick et al. | Aug. 30, 1932 |
| 1,933,971 | Dalheimer | Nov. 7, 1933 |
| 2,181,288 | Washburn | Nov. 28, 1939 |
| 2,717,092 | Gartner et al. | Sept. 6, 1955 |
| 3,018,803 | Hosselman | Jan. 30, 1962 |